United States Patent
Scheremeta

[19]

[11] Patent Number: 6,066,843

[45] Date of Patent: May 23, 2000

[54] LIGHT DISCRIMINATOR FOR A THERMOSTAT

[75] Inventor: William H. Scheremeta, Winsted, Conn.

[73] Assignee: Lightstat, Inc., Winsted, Conn.

[21] Appl. No.: 09/055,804

[22] Filed: Apr. 6, 1998

[51] Int. Cl.[7] .......................... H01J 40/14; G05D 23/00
[52] U.S. Cl. .................. 250/214 AL; 236/91 C
[58] Field of Search ...................... 250/214 AL; 340/600

[56] References Cited

U.S. PATENT DOCUMENTS

| | | |
|---|---|---|
| Re. 32,450 | 6/1987 | Blake . |
| Re. 33,205 | 4/1990 | Blake . |
| 3,672,268 | 6/1972 | Scheibel et al. . |
| 4,041,308 | 8/1977 | Fujita . |
| 4,079,388 | 3/1978 | Takahama et al. . |
| 4,220,412 | 9/1980 | Shroyer et al. . |
| 4,464,049 | 8/1984 | Schroeder . |
| 4,758,767 | 7/1988 | Blake . |
| 4,858,767 | 8/1989 | Myers et al. . |
| 5,037,198 | 8/1991 | Gaboury . |
| 5,039,850 | 8/1991 | Yamaguchi . |
| 5,039,853 | 8/1991 | Blake et al. . |
| 5,055,669 | 10/1991 | Blake et al. . |
| 5,088,645 | 2/1992 | Bell . |
| 5,598,000 | 1/1997 | Popat ........................................ 250/206 |
| 5,803,358 | 9/1998 | Ruettiger ........................... 250/214 AL |

*Primary Examiner*—Edward P. Westin
*Assistant Examiner*—Glenn T Kinnear
*Attorney, Agent, or Firm*—McCormick, Paulding & Huber LLP

[57] ABSTRACT

A thermostat for controlling the actuation of a heating, ventilation and air conditioning system includes a light discriminator that determines the occupancy of an occupancy space by sensing the presence of artificial light and adjusts the temperature set point of the thermostat accordingly. The light discriminator includes a photodetection device, such as a photodiode, that provides an output current that is proportional to the radiant flux of the ambient light of the occupancy space where it is mounted. A filter circuit cancels the undesirable frequency components of the output signal of the photodiode, such as the frequency components associated with sunlight. The filtered signal is therefore representative of the artificial light used to illuminate the occupancy space. A controller adjusts the temperature set point of the thermostat in response to the filtered signal.

22 Claims, 4 Drawing Sheets

LIGHT DISCRIMINATOR FOR A THERMOSTAT

FIELD OF THE INVENTION

The present invention relates generally to thermostats and deals more specifically to a thermostatic device that adjusts the temperature of a room or occupancy space according to the presence of man-made (artificial) light, which is indicative of occupancy of a business or occupancy space.

BACKGROUND OF THE INVENTION

Thermostats for heating, ventilation and air conditioning systems (HVAC) sense the temperature of a room or office and provide a signal to the system to cool or heat the occupancy space in accordance with a prescribed temperature set point. When the temperature of the occupancy space rises above or below the set point, an appropriate signal is provided to the HVAC system which in response heats or cools the occupancy space.

To reduce the costs of heating and cooling an occupancy space the set point of the thermostat may be adjusted according to the occupancy of the occupancy space. For example, when heating a home or office, the set point is generally lowered in the evening, when the homeowners are sleeping or the office is unoccupied, in order to conserve energy. The most common method of adjusting the set point of the thermostat is by using a timer which adjusts the set point according to the time and day of the week when the office or home is likely to be unoccupied. These type of thermostats are very effective when the occupancy of the occupancy space is predictable. However, these thermostats are less effective when the occupancy continually changes. Furthermore, these timed thermostats can not be easily reprogrammed nor is it practical to continually reprogram the thermostat for varying occupancy rate, especially for offices where the employees may periodically work on weekends or holidays.

To overcome the drawbacks of the timed thermostats, a thermostat may sense a condition that is indicative of the occupancy of the occupancy space, such as the motion, sound, light, water flow in the plumbing and voltage loads in the house or office, as shown in U.S. Pat. No. 5,088,645 to Bell. LIGHTSTAT thermostats are made by the assignee herein so that the set point of the thermostat can be adjusted in accordance with the intensity level of the ambient light present in the occupancy space. Such a light sensing thermostat functions under the premise that if the ambient light is above a predetermined intensity level, such as when the lights in the room are illuminated, then the room is occupied, and when the room is below the predetermined intensity level, the room is unoccupied. Such thermostats cannot distinguish between natural light and artificial light. The referenced thermostats must be located away from windows or direct sunlight to provide an unambiguous indication of the occupancy of the room. Since these thermostats are particularly difficult to adjust for rooms that are well lit by natural light, there is a need for a thermostat that distinguishes between daylight and artificial light.

Accordingly, it is an object of the present invention to provide a light sensitive thermostat that adjusts the temperature set point in a fashion better related to the occupancy of the occupancy space by detecting as having first the presence of artificial light, and then providing an output related only to the presence of artificial light.

It is another object to provide a thermostat that provides a more accurate indication of the occupancy of a room, and adjusts the thermostat's set point accordingly.

The above and other objects and advantages of this invention will become more readily apparent when the following description is read in conjunction with the accompanying drawings.

SUMMARY OF THE INVENTION

According to the present invention, a light discriminator is provided for a light sensitive thermostat to more efficiently control a heating, ventilation and air conditioning (HVAC) system which heats or cools an occupancy space to a desired temperature, defined by a temperature set point. The thermostat includes a temperature sensing means for measuring the ambient temperature of the occupancy space, and means for generating a control signal, in response to the measured ambient temperature and the temperature set point, to actuate the HVAC system and adjust the temperature of the occupancy space. The light discriminator includes a light sensing means for providing a detection signal representative of the intensity of the ambient light of the occupancy space. The light discriminator further includes a filtering means for generating a light signal representative of the intensity of artificial light present in the occupancy space in response to the detection signal, and an adjusting means for changing the temperature set point in response to that light signal.

According to another aspect of the present invention, a thermostat is provided for a heating, ventilation and air conditioning (HVAC) system to maintain the temperature of an occupancy space at a desired temperature in accordance with a temperature set point. The thermostat includes a light sensing means for providing a detection signal representative of the intensity of the ambient light of the occupancy space, and a filtering means for generating a light signal representative of the intensity of artificial light present in the occupancy space in response to the detection signal. The thermostat further includes an adjusting means for changing the temperature set point in response to that light signal. A temperature sensing means provides a temperature signal indicative of the ambient temperature of the occupancy space. An actuating means generates a control signal to actuate the HVAC system to adjust the temperature of the occupancy space in accordance with the temperature signal and with the temperature set point.

According to another aspect of the present invention, a method of adjusting the temperature of an occupancy space in accordance with the presence of artificial light includes the steps of generating a detection signal representative of the intensity of the ambient light of the occupancy space, and filtering the detection signal to eliminate the frequency components of light outside of a predetermined frequency range. The frequency range is representative of the artificial light in the occupancy space. The method further includes the steps of adjusting a temperature set point of the thermostat in response to the filtered detection signal.

DETAILED DESCRIPTION OF THE PREFERRED EMBODIMENTS

Figure 1:
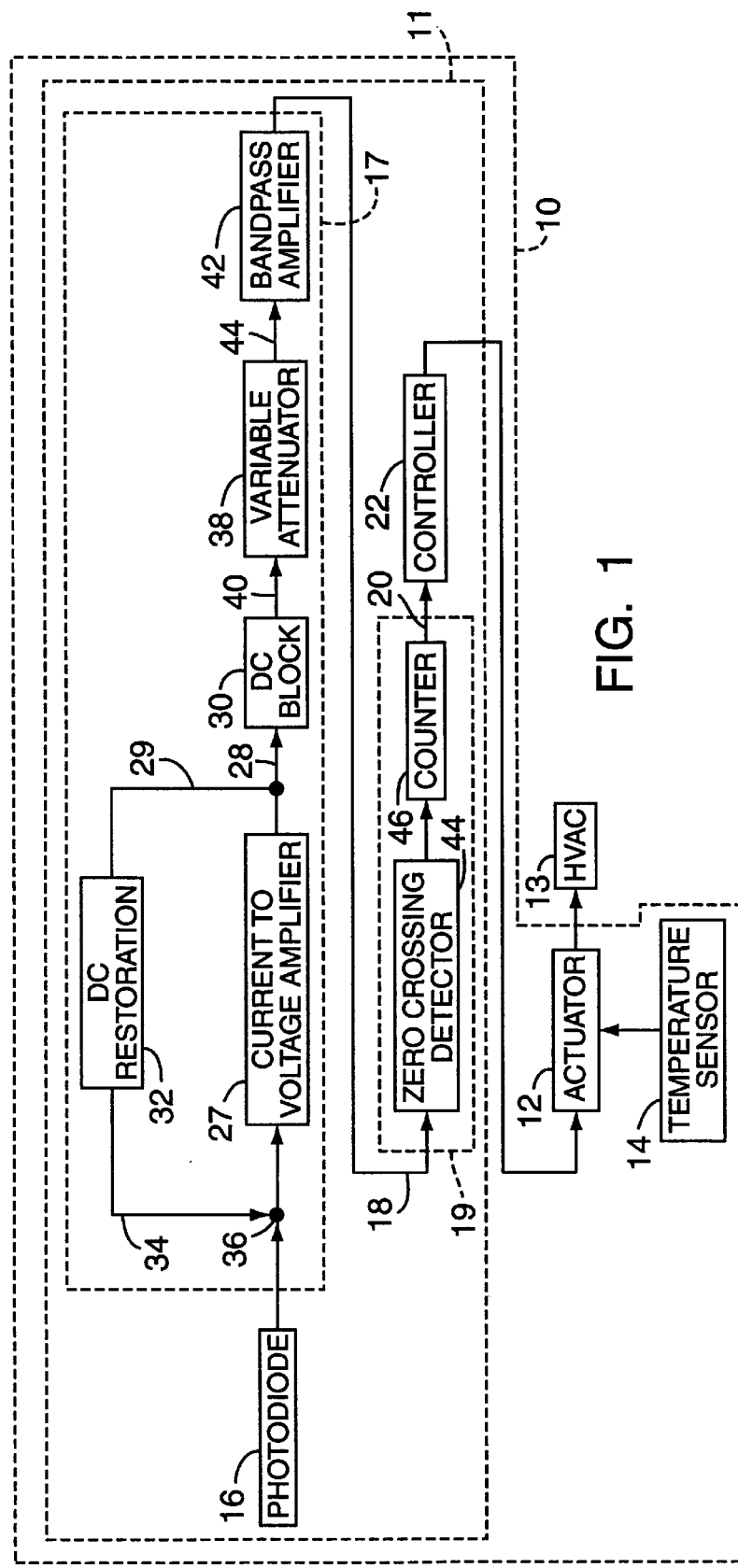
FIG. 1 is a functional block diagram showing an embodiment of a thermostat embodying the present invention.

Turning now to the drawings, the thermostat 10 of FIG. 1 comprises a light discriminator 11 that detects the presence of the artificial light in an occupancy space and then generates a temperature set point signal in response to the presence of the artificial light in the occupancy space. Artificial light is defined herein as light whose instantaneous intensity varies with the instantaneous magnitude of voltage provided by any man-made alternating source operating at any of the well-known standard frequencies (i.e., 50 Hz, 60 Hz, 400 kHz). Such a definition of artificial light does not include light generated from a direct current source with no measurable intensity fluctuation, such as light from a flashlight powered from dc batteries. The set point signal is indicative of the desired temperature of the occupancy space. The light discriminator 11 provides the set point signal to an actuator 12 which generates a control signal to actuate the HVAC system 13 in accordance with the desired temperature and the actual temperature of the occupancy space which is measured by a temperature sensing device 14.

The light discriminator 11 of FIG. 1 comprises a photo-detection device 16, such as a photodiode, that provides an output current that is proportional to the radiant flux of the ambient light of the occupancy space where it is mounted. The ambient light detected by the photodiode 16 comprises frequency components indicative of natural light sources, such as sunlight, and artificial light sources, such as lamps.

The intensity of light sources radiate at distinctive frequencies. For example, the intensity of sunlight changes very slowly as a result of clouds passing before the sun and thus, changes at low frequencies. On the other hand, the intensity of a light source powered by an alternating current, such as tungsten, fluorescent or halogen bulbs, change at a relatively high frequency which corresponds which derives from the ac cycle frequency. For tungsten, fluorescent and halogen bulbs, the frequency of the light intensity is approximately 100–120 Hz, or twice the line frequency of the ac source powering the bulb. There is additional frequency content at higher harmonics of the line frequency of the AC source. Fluorescent bulbs also have detectable intensity fluctuations in the 300 kHz to 500 kHz range which is related to the frequency of plasma discharge within the fluorescent bulb.

Referring to the functional block diagram of the thermostat 10 of FIG. 1, the output signal generated by the photodiode 16 is provided to filter circuit 17 which cancels the undesirable frequency components, which are representative of the natural light and selected artificial light, from the output signal. Filter circuit 17 therefore provides a filtered signal at lead 18 representative of the intensity of the artificial light in the occupancy space. The components of circuit 17 may also be selected to further detect light radiating only from a fluorescent bulb. The filtered signal is then provided to a frequency detector 19 which measures the frequency of this signal. As discussed above, the frequency of the filtered signal is indicative of the type of artificial light present in the occupancy space. The frequency signal at lead 20 is provided to a controller 22 which adjusts the temperature set point of the thermostat 10 according to the type of light present. Generally in the winter, the set points for actuating a furnace are lowered when the artificial light sources in the room are off (unoccupied occupancy space) and raised when the artificial light sources are on (occupied occupancy space).

The filter circuit 17 includes a current to voltage amplifier 27 which provides an output voltage proportional to the input current provided by the photodiode 16. The voltage signal is provided via leads 28,29 to a DC block 30 and a DC restoration circuit 32, respectively. The output of the DC restoration circuit at 34 is fed back to the input of the current-to-voltage amplifier 27 at junction 36. The DC restoration circuit 32 inverts the signal to provide negative feedback to the amplifier 27 to cancel the low frequency components of the voltage signal. This negative feedback increases the dynamic range of light which can be detected by the photodiode 16 and therefore, allows the discriminating circuit to function properly in a sunny occupancy space.

The output of amplifier 27 is also provided to DC block 30 which further filters the DC frequency components of the voltage signal and removes any offset arising from the practicalities of implementing the circuit. In the steady state, only components of the artificial light will pass through the DC block 30. The output of the DC block is then provided to a variable attenuator 38 via lead 40 which attenuates the blocked signal to allow the sensitivity of the circuit to be adjusted.

The attenuated signal is then provided to a band pass filter 42 via lead 44. The band pass filter permits the frequency components within a predetermined range to pass through and filters out all other frequency components. The desirable frequency range is dependent upon the type of light that is generally used in the occupancy space. For example, the band pass filter 42 may be selected to pass the voltage of a frequency component within the range of about 85 Hz to about 135 Hz to detect the presence of light from artificial light sources including tungsten, fluorescent or halogen light bulbs, or within the range of about 300 kHz to about 500 kHz to detect the presence of light from a fluorescent light source only. The band pass filter 42 also amplifies the passed signal to a level usable by the frequency detector 19.

The frequency detector 19 includes a zero crossing detector 44 and the counter 46 which provide a means to measure the frequency component of the passed signal that is representative of the type of light source in the occupancy space. The zero crossing detector 44 provides a signal to the counter 46 each time it detects the voltage crossing the zero axis. For example, a number of rising edge or trailing edge zero crossings of 120 for a one second time period, or a time period between zero crossings of approximately 8.33 milliseconds indicates that the input signal has a frequency of 120 Hz. The output signal at lead 20 is provided to the controller 22 which evaluates the frequency of the output signal and adjusts the set points of the thermostat 10 accordingly.

As describe hereinbefore, the controller 22 provides the temperature set point signal to actuator circuit 12 that is representative of the desired temperature of the occupancy space when the room is occupied or unoccupied. Actuator circuit 12 also receives a signal from the temperature sensor 14 that is representative of the actual-temperature of the occupancy space. Actuator circuit 12 compares the temperature of the occupancy space with the temperature set point signal and provides a command signal to the HVAC system 13 to heat or cool the occupancy space accordingly. In the winter months, the HVAC system provides heat to the occupancy space when the temperature of the heat is below the temperature set point. In the summer months, the HVAC system 13 provides air conditioning to cool the occupancy space when the temperature of the occupancy space is greater than temperature set point.

Figure 2:
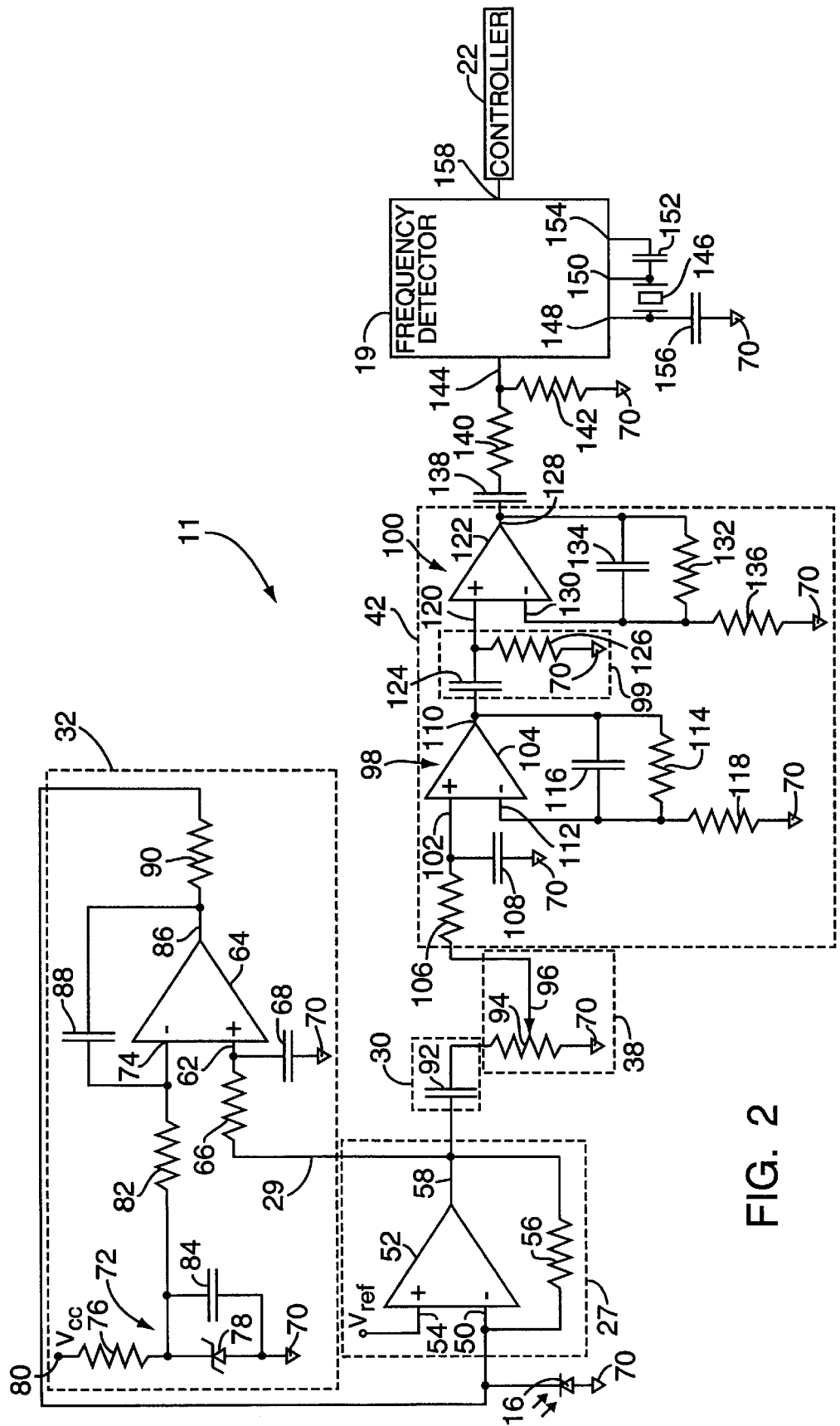
FIG. 2 is a circuit diagram of a thermostat embodying the present invention of FIG. 1.

Turning now to the schematic diagram of FIG. 2, the photodiode 16 is connected to the inverting input 50 of amplifier 52 of the current to voltage amplifier 27. A predetermined reference voltage is connected to the non-inverting input 54 of amplifier 52. Feedback resistor 56 is connected between the output 58 and inverting input 50 of the amplifier 52. The output 58 is connected via lead 29 to a low pass filter of the DC restoration circuit 32. The output lead 29 is connected to the non-inverting input 62 of amplifier 64 through resister 66. Capacitor 68 is connected from the non-inverting input 62 of amplifier 64 to ground 70. A compensating circuit 72 is connected to the inverting input 74 of amplifier 64. The compensating circuit 72 comprises resistor 76 and zener diode 78 connected in series between dc power 80 and ground 70. The junction therebetween is connected to the inverting input 74 of amplifier 64 through resistor 82. Filter capacitor 84 is connected parallel to zener diode 78. The output 86 of amplifier 64 is fed back to its inverting input 74 through capacitor 88. The output 86 is then fed back to the inverting input 50 of amplifier 52 through resistor 90.

The output 58 of amplifier 52 is also connected to capacitor 92 to block the DC component of the output voltage signal of amplifier 52. Capacitor 92 is connected to one end of a potentiometer 94 having its other end connected to the ground 70 and its wiper 96 connected to the band pass filter 42.

The band pass filter 42 comprises a low pass filter 98, a high pass filter 99 and a low pass filter 100 cascaded together. The attenuated signal at 96 is provided to the non-inverting input 102 of amplifier 104 through resistor 106. Capacitor 108 is connected between the non-inverting input 102 of amplifier 104 and ground 70. The output 110 of amplifier 104 is connected to its inverting input 112 through resistor 114 and capacitor 116 which are connected in parallel. Resistor 118 is connected between the inverting input 112 of amplifier 104 and the ground 70.

The output 110 is then connected to the non-inverting input 120 of amplifier 122 of the low pass filter 100 through capacitor 124. Resistor 126 is connected between the non-inverting input 120 of amplifier 122 and ground 70. The output 128 of amplifier 122 is connected to its inverting input 130 through resistor 132 and capacitor 134 which are connected in parallel. Resistor 136 is connected between the inverting input 130 and the ground 70.

The output 128 of amplifier 122 is connected to an RC network comprising a capacitor 138 and resistors 140,142 connected in series to ground. The junction between resistor 140 and resistor 142 is connected to port 144 of the frequency detector 19 which is similar to an integrated circuit MC68HC705J1A manufactured by Motorola, Inc. Such an integrated circuit may also provide those functions associated with the controller 22. A silicon crystal 146 is connected between ports 148 and 150 of the frequency detector 18. Capacitor 152 is connected between ports 150 and 154. Capacitor 156 is connected from port 148 and ground 70. The crystal 146 and capacitors 152,156 provide a known frequency to the counter for determining the number of zero crossings.

The output port 158 of the frequency detector 19 is connected to the controller 22 which in turn adjusts the set point of the thermostat in accordance to an algorithm.

Figure 3:
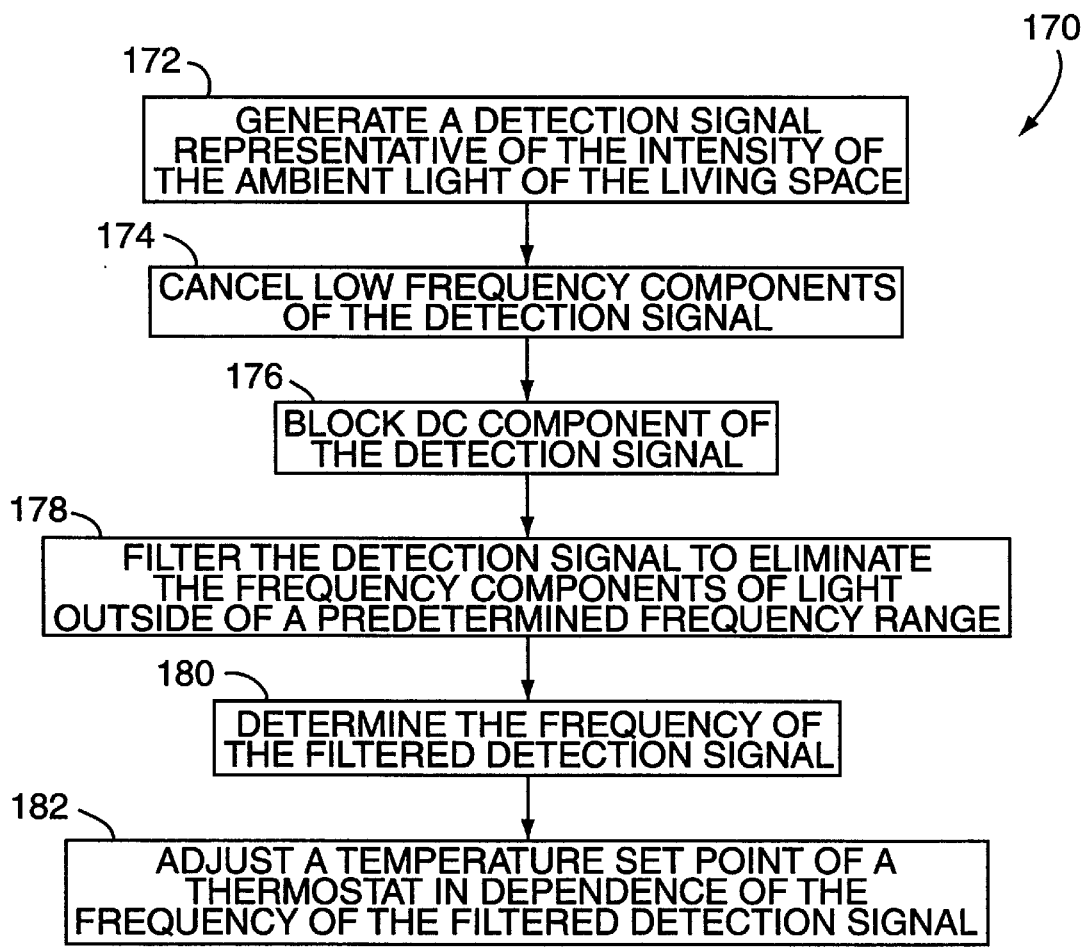
FIG. 3 is a functional diagram of a preferred sequence of operation of the thermostat of FIG. 1 to adjust the temperature set point of the thermostat in accordance with the occupancy of the occupancy space.

Referring to the flow diagrams of FIG. 3, the method 170 of adjusting the temperature set point of a thermostat in response to artificial light within an occupancy space comprises the steps, in the block 172, of converting the ambient light of the occupancy space to a detection signal representative of the frequency change of the intensity of the ambient light. In blocks 174 and 176, the low frequency and DC components of the ambient light are canceled from the detection signal. The canceled signal is then filtered to eliminate the frequency components outside a predetermined range; see block 178. The predetermined range is representative of the type of light sources that the thermostat is intended to detect. Referring to block 180, the frequency of the filtered signal is then measured and the frequency value is provided to the controller 22. The controller 22 (see block 182) then adjusts the temperature set point of the thermostat by means of an analog setpoint signal in accordance with the occupancy of the occupancy space. The setpoint signal is then used to operate the HVAC 13 via the actuator 12.

Figure 4:
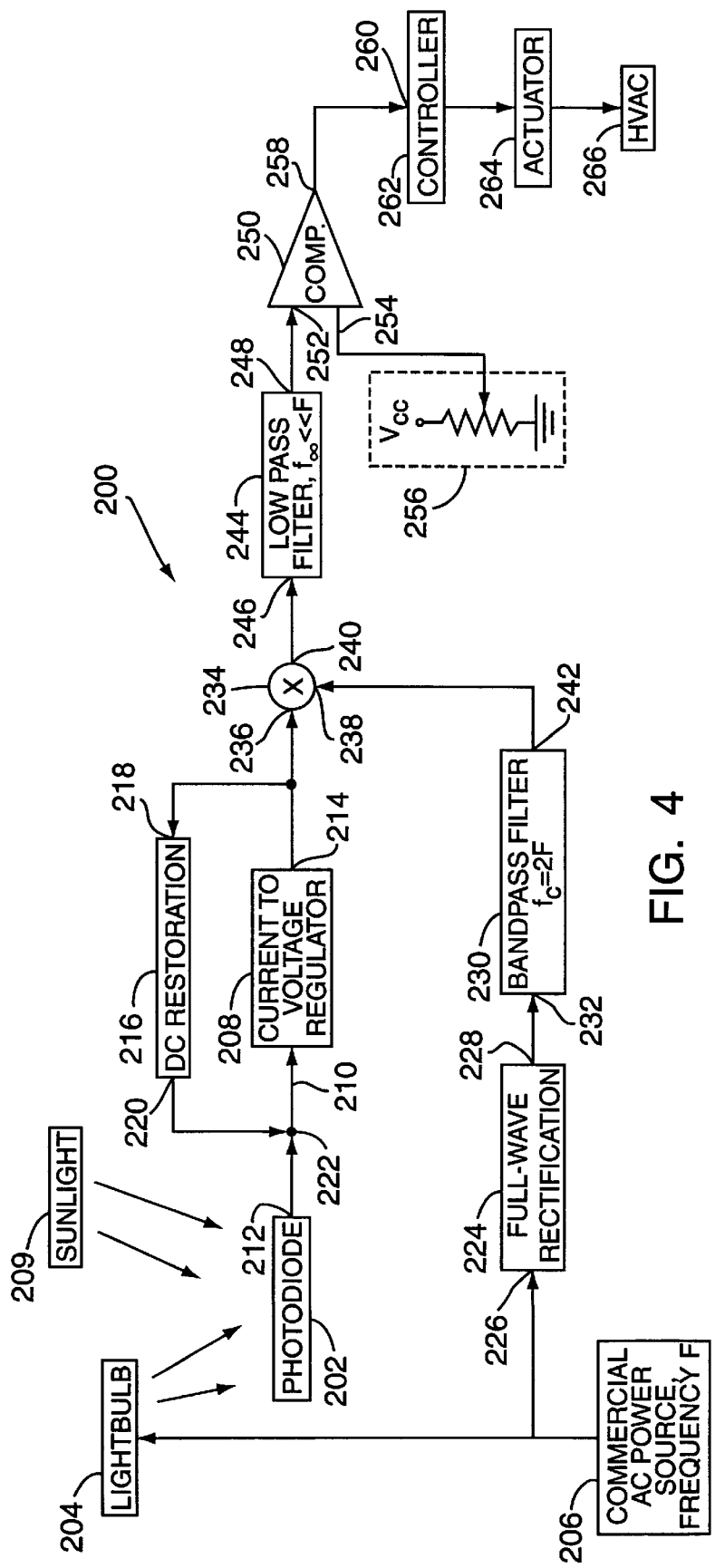
FIG. 4 is a schematic circuit in block diagram form of a light discriminator for a thermostat in accordance with a second embodiment of the present invention.

Alternatively, the temperature setpoint may be implemented by a digital or discrete signal by means of, for example, using a comparator to compare the signal issuing from the controller 22 to a threshold voltage level (see FIG. 4). The comparator generates a digital setpoint signal having either a high or low value in dependence on the relationship between the controller and threshold signal voltages. The digital setpoint signal is then be used to operate the HVAC 13 via the actuator 12.

Turning now to FIG. 4, a light discriminator for a thermostat in accordance with a second embodiment of the present invention is designated generally by the reference number 200. The light discriminator 200 includes a photodetection device 202, such as a photodiode, for detecting light from an artificial light source, such as a light bulb 204 powered from a commercial ac power source 206, or from a natural source 209, such as sunlight. The artificial light source may include those sources powered by a commercial ac power source such as tungsten, fluorescent and halogen bulbs. The photodetection device 202 provides an output current that is proportional to the radiant flux of the ambient light of the occupancy space where it is mounted. A current to voltage detector 208 includes an input 210 for receiving a current signal from an output 212 of the photodiode 202, and output 214. A DC restoration circuit 216 has an input 218 coupled to the output 214 of the current to the voltage detector 208, and an output 220 is fed back at junction 222 to the input 210 of the current to voltage detector 208. The output 214 of the current to voltage detector 208 provides an output voltage signal proportional to the input current provided by the photodiode 202 less a restoration current provided by the DC restoration circuit 216. The DC restoration circuit filters out the low frequency components of the voltage signal by providing negative feedback to the current to voltage detector 208.

A full wave bridge rectifier 224 includes an input 226 to be coupled to the ac power source 206, and an output 228 coupled to a bandpass filter 230 at its input 232. A multiplier 234 includes first and second inputs 236, 238 respectively, and an output 240. The first input 236 of the multiplier is coupled to the output 214 of the current to voltage detector 208, and the second input 238 of the multiplier 234 is coupled to an output 242 of the bandpass filter 230. A lowpass filter 244 includes an input 246 for receiving a multiplied signal from the output 240 of the multiplier 234, and an output 248 for providing a DC voltage proportional to any 120 Hz frequency component in sum of light sources. A comparator 250 has a first input 252 coupled to the output 248 of the lowpass filter 244, and a second input 254 coupled to a voltage reference 256. As shown, the voltage reference 256 may be a potentiometer where the second input 254 of the comparator 250 is coupled to a wiper of the potentiometer which is adjustable to carry a desired threshold voltage.

An output 258 of the comparator 250 is coupled to an input 260 of a controller 262. The controller 262 controls an actuator 264, which in turn switches on/off an HVAC 266 similar to the embodiment of FIGS. 1–3.

In operation, the photodiode 202 converts fluctuations of light impinging thereon into fluctuations of current at the output 212 of the photodiode 202. The current fluctuations are fed to the input 210 of the current to voltage detector 208 where the magnitude of the received current is converted into a voltage fluctuation signal at the output 214 in which the magnitude of the voltage fluctuation signal is proportional to that of the current signal generated by the photodiode 202. Low frequency voltage fluctuations, such as those corresponding to the slow change of sunlight intensity or the flashlight of a watchman are removed from the signal by the DC restoration circuit 216 by means of negative feedback at 222 to the current to voltage detector 208. The DC restoration circuit 216 also prevents the saturation of the current to voltage detector 208.

AC power from the AC power source 206 is rectified via the full wave bridge rectifier 224 to provide power for the components of the synchronous light detector circuit 200. The rectified power signal is then filtered by the bandpass filter 230, the passband of which is centered on twice the frequency of the AC power source 206. The output 242 of the bandpass filter 230 is substantially a pure sinusoidal waveform at twice the frequency of the power signal from the AC power source 206. The voltage signal from the output 214 of the current to voltage detector 208 is fed into the first input 236 of the multiplier 234, and the bandpassed signal from the bandpass filter 230 is fed into the second input 238 of the multiplier 234 to generate a multiplied signal at the output 240 of the multiplier 234.

If there is a light source with frequency components at harmonics of the frequency of the voltage variation of the AC power source 206, such as from the light bulb 204, or a mixture of low frequency fluctuations and the frequency components at harmonics of the frequency of the voltage variation of the power source 206, such as from the light bulb 204 and sunlight 208, then the output of the multiplier shall consist of a DC component and harmonics of the AC power source frequency.

If there is no light source with frequency components at harmonics of the frequency of the voltage variation of the AC power source 206, light from the light bulb 204 is not present, or just low frequency fluctuations, such as sunlight 208, then the output of the multiplier shall be zero or only have significant frequency components at twice the power line frequency. In the case of either no artificial light from an AC power source or only low frequency light such as sunlight being present, the lowpass filter 244 has a cutoff frequency substantially lower than or about one-tenth that of the signal frequency of the AC power source 206 in order to remove all signals but the DC component, which in this case is about zero. Thus, the lowpass filter 244 shall output a DC component only if the photodiode 202 receives light from a light source powered from a commercial AC source, such as the power source 206.

This DC component from the lowpass filter 244 has a voltage level which is compared with a fixed threshold voltage level provided by the voltage reference 256 to provide a discrete or binary indication of the presence of light powered by an AC source that is then used by the controller 262 to adjust via the actuator 264 the temperature setpoint of the HVAC 266 in a manner similar to that described in the embodiment of FIGS. 1–3. Alternatively, the DC component from the lowpass filter 244 may be directly measured to provide an analog indication of the magnitude of intensity of light sources powered from an AC power source (see the analog implementation of FIGS. 1–3). Either a digital or an analog signal may thus be used to establish "occupancy".

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A light discriminator for a thermostat for a heating, ventilation and air conditioning (HVAC) system to maintain the temperature of an occupancy space at a desired temperature, the thermostat including means for measuring the ambient temperature of the occupancy space and means for generating a control signal to the HVAC system for adjusting the temperature of the occupancy space in response to the ambient temperature of the occupancy space and a temperature set point; the light discriminator comprising:

light sensing means for providing a detection signal representative of the intensity of the ambient light of the occupancy space;

filtering means for generating a light signal representative of the intensity of artificial light present in the occupancy space in response to the detection signal, the filtering means including a band pass filter for filtering the detection signal to pass only the frequency components within a predetermined frequency range, the frequency range being representative of the frequency of the intensity of the artificial light in the occupancy space, and a detector for measuring the frequency of the filtered detection signal and generating the light signal; and adjusting means for changing the temperature set point in response to the light signal.

2. A light discriminator as defined in claim 1, wherein the light sensing means comprises a photodiode.

3. A light discriminator as defined in claim 1, wherein the filtering means further comprises:

means for amplifying the detection signal; and means for canceling the low frequency components of the detection signal associated with the natural light of the occupancy space.

4. A light discriminator as defined in claim 3, wherein the means for canceling the low frequency components of the detection signal comprises a dc restoration circuit for providing a negative feedback signal to the amplifying means.

5. A light discriminator as defined in claim 1, wherein the filtering means comprises a dc block circuit for canceling a dc component of the detection signal.

6. A light discriminator for a thermostat for a heating, ventilation and air conditioning (HVAC) system to maintain the temperature of an occupancy space at a desired temperature, the thermostat including means for measuring the ambient temperature of the occupancy space and means for generating a control signal to the HVAC system for adjusting the temperature of the occupancy space in response to the ambient temperature of the occupancy space and a temperature set point; the light discriminator comprising:

light sensing means for providing a detection signal representative of the intensity of the ambient light of the occupancy space;

filtering means for generating a light signal representative of the intensity of artificial light present in the occupancy space in response to the detection signal, the filtering means including a full wave rectifier for rectifying an AC power source signal, a bandpass filter centered at about twice the power source frequency and coupled to an output of the full wave rectifier for generating a bandpassed signal having a frequency at about twice the AC power source signal, and a multiplier circuit for multiplying the detection signal and the bandpassed signal for generating a multiplied signal having a DC component having a magnitude indicative of the intensity of artificial light received by the light sensing means; and adjusting means for changing the temperature set point in response to the light signal.

7. A light discriminator as defined in claim 6, wherein the filtering means further includes a lowpass filter having a cutoff frequency substantially below an ac power source frequency for filtering the multiplied signal.

8. A light discriminator as defined in claim 6, wherein the filtering means includes:

means for amplifying the detection signal; and means for canceling low frequency components of the detection signal associated with the natural light of the occupancy space.

9. A light discriminator as defined in claim 8, wherein the means for cancelling includes a dc restoration circuit for providing a negative feedback signal to the amplifying means.

10. A thermostat for a heating, ventilation and air conditioning (HVAC) system to maintain the temperature of an occupancy space at a desired temperature in accordance with a temperature set point; the thermostat comprising:

light sensing means for providing a detection signal representative of the intensity of the ambient light of the occupancy space;

filtering means for generating a light signal representative of the intensity of artificial light present in the occupancy space in response to the detection signal, the filtering means including a band pass filter for filtering the detection signal to pass only the frequency components within a predetermined frequency range, the frequency range being representative of the frequency of the intensity of the artificial light in the occupancy space, and a detector for measuring the frequency of the filtered detection signal and generating the light signal;

adjusting means for changing the temperature set point in response to the light signal;

temperature sensing means for providing a temperature signal indicative of the ambient temperature of the occupancy space; and actuating means for generating a control signal to actuate the HVAC system to adjust the temperature of the occupancy space in response to the temperature signal and the temperature set point.

11. A thermostat as defined in claim 10, wherein the light sensing means comprises a photodiode.

12. A thermostat as defined in claim 10, wherein the filter means further comprises:

means for amplifying the detection signal; and means for canceling the low frequency components of the detection signal associated with the natural light of the occupancy space.

13. A thermostat as defined in claim 12, wherein the means for canceling the low frequency components of the detection signal comprises a dc restoration circuit for providing a feedback signal to the amplifying means.

14. A thermostat as defined in claim 10, wherein the filtering means comprises a dc block circuit for canceling a dc component of the detection signal.

15. A thermostat for a heating, ventilation and air conditioning (HVAC) system to maintain the temperature of an occupancy space at a desired temperature in accordance with a temperature set point; the thermostat comprising:

light sensing means for providing a detection signal representative of the intensity of the ambient light of the occupancy space;

filtering means for generating a light signal representative of the intensity of artificial light present in the occupancy space in response to the detection signal, the filtering means including a full wave rectifier for rectifying an AC power source signal, a bandpass filter coupled to an output of the full wave rectifier and centered at about twice the power source frequency for generating a bandpassed signal having a frequency at about twice the AC power source signal, and a multiplier circuit for multiplying the detection signal and the bandpassed signal for generating a multiplied signal having a DC component having a magnitude indicative of the intensity of artificial light received by the light sensing means;

adjusting means for changing the temperature set point in response to the light signal;

temperature sensing means for providing a temperature signal indicative of the ambient temperature of the occupancy space; and actuating means for generating a control signal to actuate the HVAC system to adjust the temperature of the occupancy space in response to the temperature signal and the temperature set point.

16. A light discriminator as defined in claim 15, wherein the filtering means further includes a lowpass filter having a cutoff frequency substantially below an ac power source frequency for filtering the multiplied signal.

17. A light discriminator as defined in claim 15, wherein the filtering means includes:

means for amplifying the detection signal; and means for canceling low frequency components of the detection signal associated with the natural light of the occupancy space.

18. A light discriminator as defined in claim 17, wherein the means for cancelling includes a dc restoration circuit for providing a negative feedback signal to the amplifying means.

19. A method of adjusting the temperature of an occupancy space in accordance with the presence of artificial light; the method comprising the steps of:

(a) generating a detection signal representative of the intensity of the ambient light of the occupancy space;

(b) filtering the detection signal to eliminate the frequency components of light outside of a predetermined frequency range, the frequency range being representative of artificial light in the occupancy space; and (c) adjusting a temperature set point of a thermostat in response to the filtered detection signal, including determining the frequency of the filtered detection signal, and adjusting a temperature set point of a thermostat in response to the frequency of the filtered signal.

20. A method of adjusting the temperature of an occupancy space in accordance with the presence of artificial light; the method comprising the steps of:

(a) generating a detection signal representative of the intensity of the ambient light of the occupancy space;

(b) canceling low frequency components of the detection signal;

(c) filtering the detection signal to eliminate the frequency components of light outside of a predetermined frequency range, the frequency range being representative of artificial light in the occupancy space; and (d) adjusting a temperature set point of a thermostat in response to the filtered detection signal.

21. A method as defined in claim 20, further comprising, after step (a), the step of blocking DC component of the detection signal.

22. A method of adjusting the temperature of an occupancy space in accordance with the presence of artificial light; the method comprising the steps of:

(a) generating a detection signal representative of the intensity of the ambient light of the occupancy space;

(b) filtering the detection signal to eliminate the frequency components of light outside of a predetermined frequency range, the frequency range being representative of artificial light in the occupancy space; and (c) adjusting a temperature set point of a thermostat in response to the filtered detection signal, including full wave rectifying an AC power source signal to produce a full wave rectified signal, filtering the full wave rectified signal over a range of frequencies centered at about twice the power source frequency for generating a bandpassed signal having a frequency at about twice the AC power source signal, and multiplying the detection signal and the bandpassed signal for generating a multiplied signal having a DC component having a magnitude indicative of the intensity of the ambient light of the occupancy space.

* * * * *